US010068155B2

(12) United States Patent
Kalyuzhny

(10) Patent No.: US 10,068,155 B2
(45) Date of Patent: Sep. 4, 2018

(54) VERIFICATION OF OPTICAL CHARACTER RECOGNITION RESULTS

(71) Applicant: ABBYY Development LLC, Moscow (RU)

(72) Inventor: Aleksey Ivanovich Kalyuzhny, Moscow oblast (RU)

(73) Assignee: ABBYY Development LLC, Moscow (RU)

( * ) Notice: Subject to any disclaimer, the term of this patent is extended or adjusted under 35 U.S.C. 154(b) by 4 days.

(21) Appl. No.: 15/275,990

(22) Filed: Sep. 26, 2016

(65) Prior Publication Data

US 2018/0082154 A1 Mar. 22, 2018

(30) Foreign Application Priority Data

Sep. 16, 2016 (RU) ................. 2016137136

(51) Int. Cl.
| | | |
|---|---|---|
| G06K 9/18 | (2006.01) | |
| G06K 9/62 | (2006.01) | |
| G06K 9/00 | (2006.01) | |
| G06K 9/20 | (2006.01) | |

(52) U.S. Cl.
CPC ....... *G06K 9/6263* (2013.01); *G06K 9/00469* (2013.01); *G06K 9/18* (2013.01); *G06K 9/20* (2013.01); *G06K 9/6215* (2013.01); *G06K 9/6218* (2013.01)

(58) Field of Classification Search
CPC .......... G06K 2209/01; G06K 9/00469; G06K 9/00442; G06K 9/344; G06K 9/72; H04N 2201/0096
See application file for complete search history.

(56) References Cited

U.S. PATENT DOCUMENTS

| | | | | |
|---|---|---|---|---|
| 5,933,531 A | * | 8/1999 | Lorie | G06K 9/033 345/108 |
| 6,269,188 B1 | * | 7/2001 | Jamali | G06K 9/03 382/177 |
| 7,092,567 B2 | * | 8/2006 | Ma | G06K 9/723 382/177 |

(Continued)

FOREIGN PATENT DOCUMENTS

WO WO2015028587 A2 3/2015

*Primary Examiner* — Eueng-Nan Yeh
(74) *Attorney, Agent, or Firm* — Lowenstein Sandler LLP

(57) ABSTRACT

A method of verifying optical character recognition (OCR) results may involve: performing OCR on one or more initial images of a document and displaying initial OCR results of the document to a user; receiving a feedback from the user regarding an error location in the initial OCR results, the error location being a location of a misspelled character sequence; receiving an additional image of the document, which corresponds to the error location, and performing OCR of the additional image to produce additional OCR results; identifying a cluster of character sequences, which correspond to the error location, using the initial OCR results and the additional OCR results; identifying an order of character sequences in the cluster of character sequences based on their respective probability values; and displaying to the user modified optical character recognition results, which contain in the error location a corrected character sequence.

19 Claims, 3 Drawing Sheets

(56) References Cited

U.S. PATENT DOCUMENTS

| | | | |
|---|---|---|---|
| 8,059,897 B2 * | 11/2011 | Xu | H04M 1/72522 345/581 |
| 8,285,049 B2 | 10/2012 | Predovic et al. | |
| 8,515,185 B2 * | 8/2013 | Lee | G06K 9/036 382/190 |
| 8,719,014 B2 | 5/2014 | Wagner | |
| 2004/0010758 A1 | 1/2004 | Sarkar et al. | |

* cited by examiner

VERIFICATION OF OPTICAL CHARACTER RECOGNITION RESULTS

CROSS REFERENCE TO RELATED APPLICATIONS

The present application claims the benefit of priority under 35 USC 119 to Russian Patent Application No. 2016137136, filed Sep. 16, 2016; disclosure of which is herein incorporated by reference in its entirety for all purposes.

FIELD

The present document relates to computer systems and more specifically to systems and methods for verification of optical character recognition results.

BACKGROUND

Optical character recognition (OCR) is a computer-implemented conversion of text images (including typed, handwritten, or printed text) into computer-encoded electronic documents.

SUMMARY

One embodiment is a method comprising: performing optical character recognition on one or more initial images of a document to produce initial optical character recognition results and displaying the initial optical character recognition results of the document to a user; receiving a feedback from the user regarding an error location in the initial optical character recognition results, wherein the error location is a location of a misspelled character sequence in the initial optical character recognition results; receiving an additional image of the document, wherein the additional image contains a portion of the document, which corresponds to the error location, and performing optical character recognition of the additional image to produce additional optical character recognition results; identifying a cluster of character sequences, which correspond to the error location, using the initial optical character recognition results and the additional optical character recognition results; identifying an order of character sequences in the cluster of character sequences based on their respective probability values; and displaying to the user modified optical character recognition results, which contain in the error location a corrected character sequence, but otherwise are identical to the initial optical character recognition results, wherein the corrected character sequence is a character sequence, which has the highest probability value among the character sequences of the cluster, while being different from the misspelled character sequence.

Another embodiment is a system comprising: (a) a memory; (b) a display; (c) a processing device, which is coupled to the memory and the display, the processing device is configured to: perform optical character recognition on one or more initial images of a document to produce initial optical character recognition results and display the initial optical character recognition results to a user; receive a feedback from the user regarding an error location in the initial optical character recognition results, wherein the error location is a location of a misspelled character sequence in the initial optical character recognition results; receive an additional image of the document, wherein the additional image contains a portion of the document, which corresponds the error location, and perform optical character recognition on the additional image to produce additional optical character recognition results; identify a cluster of character sequences, which correspond to the error location, using the initial optical character recognition results and the additional optical character recognition results; identify an order of character sequences in the cluster of character sequences based on their respective probability values; and display to the user modified optical character recognition results, which contain in the error location a corrected character sequence, but otherwise are identical to the initial optical character recognition results, wherein the corrected character sequence is a character sequence, which has the highest probability value among the character sequences of the cluster, while being different from the misspelled character sequence.

Yet another embodiment is a computer-readable non-transitory storage medium comprising executable instructions that, when executed by a processing device, cause the processing device to: perform optical character recognition on one or more initial images of a document to produce initial optical character recognition results and display the initial optical character recognition results of the document to a user; receive a feedback from the user regarding an error location in the initial optical character recognition results, wherein the error location is a location of a misspelled character sequence in the initial optical character recognition results; receive an additional image of the document, wherein the additional image contains a portion of the document, which corresponds to the error location, and perform optical character recognition on the additional image to produce additional optical character recognition results; identify a cluster of character sequences, which correspond to the error location, using the initial optical character recognition results and the additional optical character recognition results; identify an order of character sequences in the cluster of character sequences based on their respective probability values; and display to the user modified optical character recognition results, which contain in the error location a corrected character sequence, but otherwise are identical to the initial optical character recognition results, wherein the corrected character sequence is a character sequence, which has the highest probability value among the character sequences of the cluster, while being different from the misspelled character sequence.

FIGURES

Figure 3:
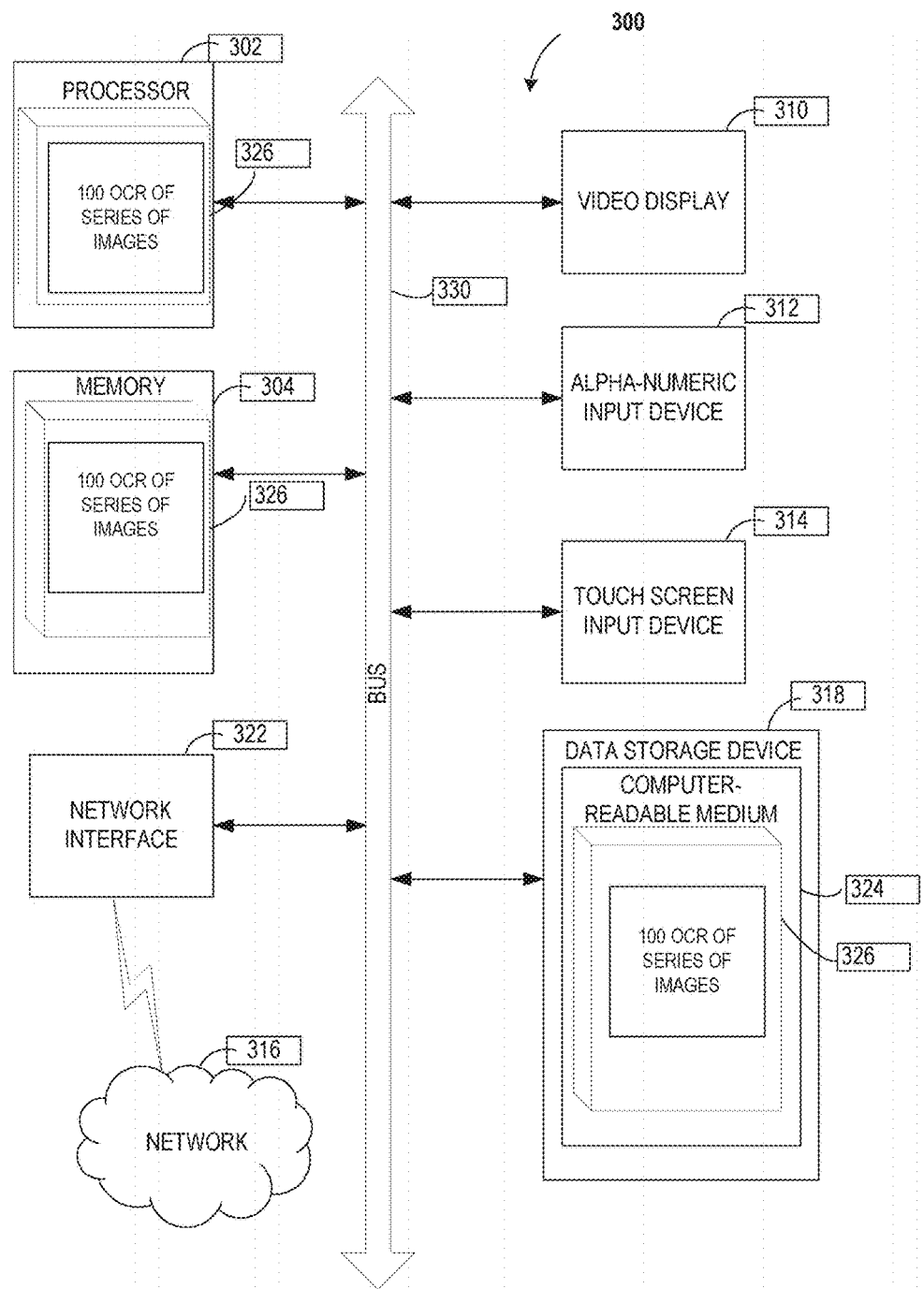

FIG. 3 schematically depicts an illustrative example of a computer system, which may be used for implementing the disclosed methods.

DETAILED DESCRIPTION

Related Documents

The following documents, which are incorporated herein by reference in their entirety, may be helpful for understanding the present disclosure: a) U.S. patent application Ser. No.

15/168,548 filed May 31, 2016; b) U.S. patent application Ser. No. 15/168,525 filed May 31, 2016; c) U.S. patent application Ser. No. 15/195,603 filed Jun. 28, 2016.

Disclosure

Unless otherwise specified "a" or "an" means one or more.

Described herein are methods and systems for performing optical character recognition (OCR) of a series of images depicting symbols of a certain writing system. The writing systems whose symbols may be processed by the systems and methods described herein include alphabets that have separate symbols, or glyphs, representing individual sounds, as well as hieroglyphic writing systems that have separate symbols representing larger units, such as syllables or words.

Verification of OCR results on a mobile device, such as a mobile phone or a tablet, may be done manually, for example, by manually entering a corrected text using a keyboard, such as a virtual keyboard on a touch screen of the device. However, such manual verification of OCR results may be inconvenient for users. Disclosed methods may replace manual text entry using a keyboard in a process of verifying OCR results.

Although a particular error in OCR results of a document may be potentially corrected by re-performing an OCR process on the initial image(s), i.e. the image(s) from which the initial OCR results were produced, of the document as a whole, such approach may introduce new errors in new locations of the document. Therefore, it may be desirable to have an ability to identify in initial OCR results a particular location, which contains an error. In disclosed methods, a user may identify in initial OCR results of a processed document a particular location, which contains an error, such as an incorrectly recognized or misspelled character sequence, e.g. an incorrectly recognized or misspelled word, and in response, a program may suggest a correction for the error. The suggested correction may be the next most probable character sequence (other than the one displayed in the initial OCR results), such as a word or a sequence of words, for the particular location of the misspelled character sequence. A misspelled character sequence, such as a misspelled word, may mean a character sequence, which is presented in OCR results differently from a corresponding original character sequence in the original document. The misspelled character sequence may differ from the original sequence for example, in one or more characters and/or order of characters and/or font of characters.

In the disclosed methods, initial OCR results of one or more initial images of a document together with a user's feedback regarding a location of an error in the initial OCR results may be used for obtaining one or more additional images of the document's portion, which contains the error's location. The additional images may be better quality image(s) than the initial image(s) due to, for example, a change in one or more of an image noise, an image scale, a shooting angle, an image brightness, shutter speed, aperture, and glaring. The additional quality image(s) may be used together with the initial OCR results for producing modified OCR results, which may have a higher quality than the initial OCR results. In the modified OCR results, the error displayed in the initial OCR results may corrected automatically. Preferably, such correction is performed without affecting portions of the initial OCR results, which did not contain errors and/or did not require corrections. In some embodiments, one or both of the initial image(s) and additional image(s) may be acquired in a continuous regime. The continuous regime may be, for example, a camera preview regime, in which the acquired images are not stored in a memory of the computed system after optical character recognition, or a video recording regime, in which the acquired images may be stored in the memory of the computer system.

The disclosed methods may be used for verification of optical character recognition results of an image of an original document. The original document is a document in a form such that an image of the document may be acquired using a camera. For example, in many embodiments, the original document may be in the form of a physical object with printed text, typed text and/or handwritten text. Yet, in some other embodiments, the original document may be an image displayed, for example, on a screen or a display. In some embodiments, the disclosed methods may be used while converting a text containing image into a computer encoded electronic document with a text layer. The text containing image may be an image containing one or more of a typed text, a printed text and a handwritten text. In some embodiments, the disclosed methods may be used for extracting information from an information field of a patterned document, which also contains static element(s). Optical character recognition of patterned documents is disclosed in U.S. patent application Ser. No. 15/195,603.

"Electronic document" herein shall refer to a file comprising one or more digital content items that may be visually rendered to provide a visual representation of the electronic document (e.g., on a display or a printed material). An electronic document may be produced by scanning or otherwise acquiring an image of a paper document and/or performing optical character recognition to produce the text layer associated with the document. In various illustrative examples, electronic documents may conform to certain file formats, such as PDF, PDF/A, DjVu, EPub, JPEG, JPEG 2000, JBIG2, BMP, etc. The electronic document may include any number of pixels.

"Text layer" herein shall refer to a set of encoded text symbols. One commonly used encoding standard for text symbols is the Unicode standard. The Unicode standard commonly uses 8-bit bytes for encoding American Standard Code for Information Exchange ("ASCII") characters and 16-bit words for encoding symbols and characters of many languages. Text layer may preliminary exist within the electronic document. Or text layer may be produced by performing an Optical Character Recognition (OCR).

Although the present methods are not particularly limited by a size of a document, they may be particularly useful for verification of optical character recognition results of a relatively small original document, such as for example, a paragraph of a text or a business card using a mobile device, which is equipped with a camera. For example, the camera of the mobile device may be pointed out by a user on a hard document of interest to acquire one or more initial images of the document, which may be done, for example, in a continuous regime, such as a camera preview regime or a video recording regime. Upon processing the one or more initial images using OCR technologies, the mobile device may display initial OCR results on its screen. The mobile device may then receive a feedback from the user regarding one or more locations, which contain an error in the initial OCR results. In a mobile device with a touch screen display, the user may provide his/her feedback by identifying an error location via tapping or touching a portion the touch screen display displaying an error. In some embodiments, the user may identify multiple error locations in the initial OCR results at once. Yet in some embodiments, the user may identify one error location in the initial OCR results at a time. The camera of the mobile device may be then pointed out by the user on a particular error location to acquire one or more additional images. In the disclosed methods, upon performing OCR of the one or more additional images, a processor of the mobile device may analyze OCR results for the one or more additional images together with the initial OCR results. Based on the OCR results for the one or more additional images and the initial OCR results, the processor may select out of additional recognition options for the error location a corrected option, which is the highest probable option different from the one in the initial OCR results for the error location. The mobile device then may display modified OCR results with the corrected option for the error location but otherwise identical to the initial OCR results. The corrected option may be highlighted so that the user could easily see the correction. In some embodiments, the whole corrected character sequence option may be highlighted. Yet in some embodiments, particular character(s), such as letters or digits, which distinguish the corrected character sequence from an original misspelled character sequence (i.e. a character sequence for the error location in the initial OCR results) may be highlighted. In certain embodiments, the whole corrected character sequence option may be highlighted in one color, while particular character(s), which distinguish the corrected character sequence from the original misspelled character sequence may be highlighted in another color.

The disclosed methods may be applicable to both continuous images, which may be acquired in a continuous regime, such as a camera preview regime or a video recording regime, and to separate discreet images, which may be acquired in a photo regime. For images acquired in a continuous regime, the disclosed methods may be more convenient as such scenario allows for more interaction with a user by the computer system. For example, when images are acquired in a continuous regime, a user may identify an error location in initial OCR results of a document and then without the user moving the camera away from the document, additional image(s) of the error location may be acquired and corresponding additional optical character recognition of the error location may be performed right away. For example, if initial OCR results of a document have an error in a portion of the document, which is printed in a small font, a camera may be moved closer or zoomed in at such error location to produce one or more additional images. The additional image(s) may magnify or scale up the small font portion of the document. The magnified or scaled up text may be easier to recognize by the OCR technology. A corrected version for the small font error location produced based on OCR results for the magnified or scaled up additional image(s) and the initial OCR results may be inserted in the initial OCR results at the right location and the right scale, i.e. at the location and scale, which correspond to the small font portion of the document, to produce modified OCR results of the document.

Figure 1:
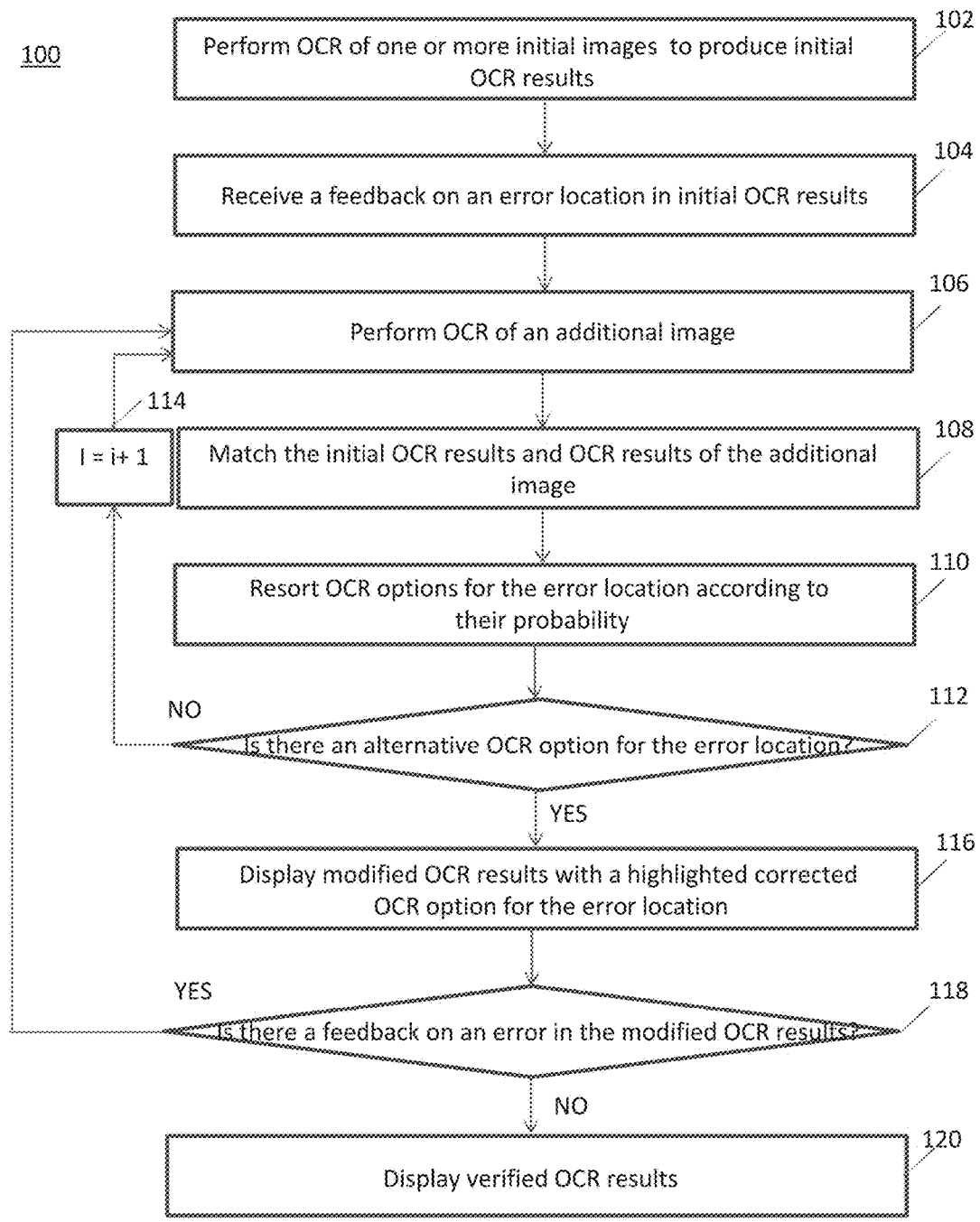
FIG. 1 is a flow-chart of an illustrative embodiment for a method for verifying optical character recognition results.

FIG. 1 presents a flow-chart of one illustrative example of method 100 for verifying OCR results. The method and/or each of its individual functions, routines, subroutines, or operations may be performed by one or more processors of a computer system executing the method. In some embodiments, method 100 may be performed by a single processing thread. Alternatively, method 100 may be performed by two or more processing threads, each thread executing one or more individual functions, routines, subroutines, or operations of the method. In an illustrative example, the processing threads implementing method 100 may be synchronized (e.g., using semaphores, critical sections, and/or other thread synchronization mechanisms). Alternatively, the processing threads implementing method 100 may be executed asynchronously with respect to each other. Therefore, while FIG. 1 and the associated description lists the operations of method 100 in certain order, various implementations of the method may perform at least some of the described operations in parallel and/or in arbitrary selected orders.

At block 102, the computer system, which may be, for example, a mobile device, such as a mobile phone or a tablet, may perform OCR of one or more initial images of an original document to produce initial OCR results. The initial image(s) may be acquired by a camera. In some embodiments, the camera may be an integral part of the computer system. Yet in some embodiments, the camera may be a separate device, which is configured to transfer acquired images to the computer system. Each of the initial images may be an image of the whole document or an image of only a portion of the document. In some embodiments, initial OCR results may be OCR results of a single initial image. Yet in some other embodiments, initial OCR results may be OCR results combined for multiple, i.e. more than one, images. U.S. patent application Ser. Nos. 15/168,548 and 15/168,525 disclose combining OCR results for multiple images. OCR results include characters of the recognized text as well as a geometric layout information, such as coordinates for each character on the image and also optionally, on how characters are organized on the image with respect to each other: for example, how individual characters, such as letters and digits, form character sequences, such as words; how individual character sequences, such as words, form text lines, etc.

Initial OCR results may be displayed to a user of the computer system for verification purposes on the computer system's screen/display/monitor. In some embodiments, the displayed initial OCR results may have the same layout as the original hard copy of the document. With such representation of the initial OCR results for the verification, the user may have a clear idea on where a portion of the document, which was displayed with an error in the initial OCR results, is located in the original hard copy of the document. As such, the user can easily figure out where to point out the camera to obtain one or more additional images to correct the error.

At block 104, the computer system may receive a feedback from the user about a presence of an error in the initial OCR results. For example, the user may identify a location of an error (an error location) in the initial OCR results, which may be done, for example, by pointing out at the error location. In certain embodiments, the user may identify an error location by highlighting it. In some embodiments, to identify an error location in the displayed OCR results, the user may tap or touch or click a place of a touch-screen display of the computer system, which corresponds to the error location. In some embodiments, to point out a whole set of errors, which may be due, for example, to the camera's cutoff of a certain portion of the original document, the user may slide his/her finger vertically down along a touch screen display. In some embodiments, the user may use special gesture, for example, swipe to identify a location, for which a text has not been found through an error.

To confirm that error location(s), which were identified by the user, were accepted for processing, the computer system may display the identified error location(s) being highlighted in a certain way. For example, the computer system may highlight the identified error location(s) using a certain background light.

Figure 2A:
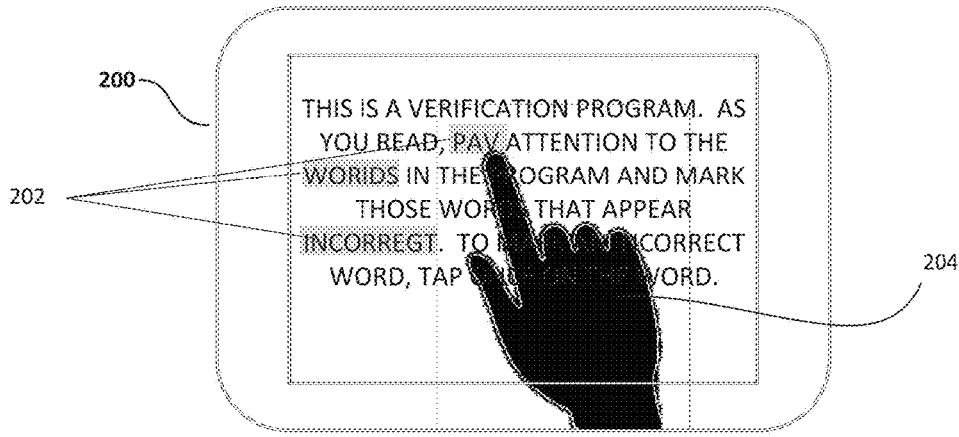
FIG. 2A illustrates how optical character recognition results are displayed to the user for their verification.

For example, FIG. 2A shows a computer system's display 200, which highlights in gray error locations 202 (misrecognized words "PAV," "WORIDS" and "INCORREGT"), which were identified by user 204 in initial OCR results displayed on display 200.

The information, which may be obtained in steps 102 and 104, namely initial OCR results as well as the information about an error location obtained from the user, may be used as a template. Additional OCR results, which may be obtained from processing one or more additional images, may be compared with this template to determine alternative OCR variants for the error location. In this template, a text portion without any identified error may be considered to be a correct one. This text portion does not require any corrections. On the other hand, a text portion with an error would be considered an incorrect one. This text portion requires corrections for the error. Such corrections may be identified from alternative OCR variants for this error containing text portion, which variants are obtained through processing one or more additional images, which cover the error containing error text portion.

Figure 2B:
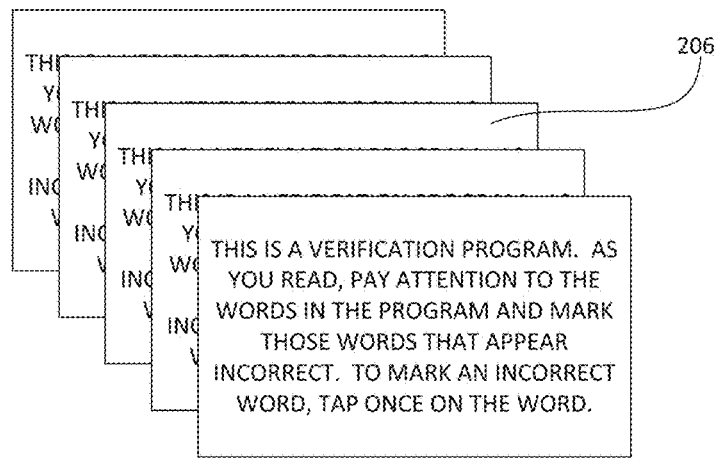
FIG. 2B illustrates how optical character recognition results are displayed to the user for their verification.

After providing a feedback about an error location in the initial OCR results, the user may point the camera at a portion of the original document, which includes a textual fragment, which corresponds to an identified error location, in order to acquire one or more additional images. Thus, at step 106, the computer system may perform OCR of an additional image to obtain its OCR results. FIG. 2B schematically illustrates obtaining OCR results for one or more additional images 206. The additional image(s) may be acquired by a camera, which may be the same or different as a camera that used to acquire the initial image(s). The camera that acquires the additional image(s) may be an integral part of the computer system or a separate device, which is configured to transfer acquired images to the computer system.

Step 108 may involve identifying a cluster of character sequences using the initial OCR results and additional OCR results, i.e. the OCR results for one or more additional images. This may be done, for example, by matching or comparing of the initial OCR results and the additional OCR results. Such matching or comparing may involve determining corresponding common feature(s), such as character or character sequences in the initial OCR results and the additional OCR results. Matching character sequences may involve strictly matching and/or fuzzily matching character sequences. For example, in certain implementations, the computer system may produce a graph, the vertices of which represent character sequences from the plurality of images, and edges interconnect the character sequences that have been identified as matching (i.e., representing the same fragment of the original text) by applying an inter-image coordinate transformation.

The initial OCR results, in which the user identified an error location, may be used as a template. Matching this template with the additional OCR results may allow identifying in the additional OCR results textual fragments, which correspond to the error location in the initial OCR results. In other words, matching this template with the additional OCR results may allow obtaining alternative OCR variants for a textual fragment, which corresponds to the error location in the initial OCR results. Matching the initial OCR results and the additional OCR results may involve identifying one or more common features, which may be common textual features, such as common character sequences, e.g. common words. For the initial OCR results, its portion, which does not contain any error, may be used for identifying such common features. On the other hand, all of the additional OCR results may be used for identifying the common features. The common features may be used as reference points for calculating a coordinate transformation from coordinates of the additional OCR results to coordinates of the initial OCR results or vice versa. Having the additional OCR results in the same coordinates as the initial OCR results may allow determining how textual objects in the additional OCR results correspond to the ones in the initial OCR results. Matching the additional OCR results and the initial OCR results may produce various alternative OCR variants (OCR character sequences, such as words) for the error location. OCR variants for the error location produced from processing the one or more additional images and the one or more additional images may be combined in a cluster. Clusters and their processing are disclosed, for example, in U.S. patent application Ser. Nos. 15/168,548 and 15/168,525, which are incorporated herein by reference in their entirety.

Additional OCR results, which are obtained by processing one or more additional images, may contain only a portion of the initial OCR results, for example, only a portion around an error location, which was identified by the user. This may happen, for example, because the user moved the camera closer to the portion of the original document, which contains the error location, or because the user zoomed the camera into the portion of the original document, which contains the error location. U.S. patent application Ser. Nos. 15/168,548 and 15/168,525, which are incorporated herein by reference in their entirety, discuss matching OCR results for images, which differ in at least one of an image noise, an image scale, a shooting angle, an image brightness, shutter speed, aperture, glaring or presence of an external document that covers at least a part of an original document.

Step 110 may involve resorting or ordering OCR variants for the error location produced from processing the one or more additional images and the one or more additional images. Such resorting or ordering may be performed based on determining a predetermined metric for each of the OCR variants. For example, such resorting or ordering may be performed based on a probability evaluation for each of the OCR variants. In some embodiments, the probability evaluation may be performed based on an edit distance metric. This metric reflects how much two OCR variants in the cluster differ between each other. A value of this metric for a particular OCR variant may be a sum of differences with each of the remaining OCR variants in the cluster (a sum edit distance). The less is a value of this metric is for a particular OCR variant in the cluster, the more probable the variant is. Thus, based on the OCR results of the one or more additional images, a new OCR variant may be added to a respective cluster, which already includes a number of OCR variants based on the initial OCR results. After that, a recalculation a value of a pre-determined metric for each OCR variant in the cluster may be performed and then OCR variants in the cluster may be resorted or reordered according to a respective recalculated value of the predetermined metric. For example, for the discussed above edit distance metric, for each OCR variant in the cluster, a sum of differences with each of the remaining OCR variants in the cluster (a sum edit distance) may be recalculated and then OCR variants in the cluster may be resorted or reordered based on their respective sum edit distance values in an increasing order, i.e. an OCR variant with the lowest sum edit distance value (i.e.

having the highest probability) goes on the top, while an OCR variant with the highest sum edit distance value (i.e. having the lowest probability) goes to the bottom.

Step 112 may involve comparing each of the resorted or reordered OCR variants, starting from with the most probable one, i.e. the one on the top of the resorted cluster, with an initial OCR variant for the error location, which was displayed in the initial OCR results and which was identified as an incorrect one by the user, in order to find the most probable OCR variant, which is different from the initial OCR variant. If such different OCR variant is found, then the method can move to step 116. If no different OCR variant is found, then through step 114 (a counter increase) the method returns to step 106 in order to obtain another additional image.

The disclosed methods do not search for alternative/different OCR variants for all the text displayed in the initial OCR results. Instead, the search for alternative/different OCR variants may be limited only to one or more error locations, which were identified by the user.

Figure 2C:
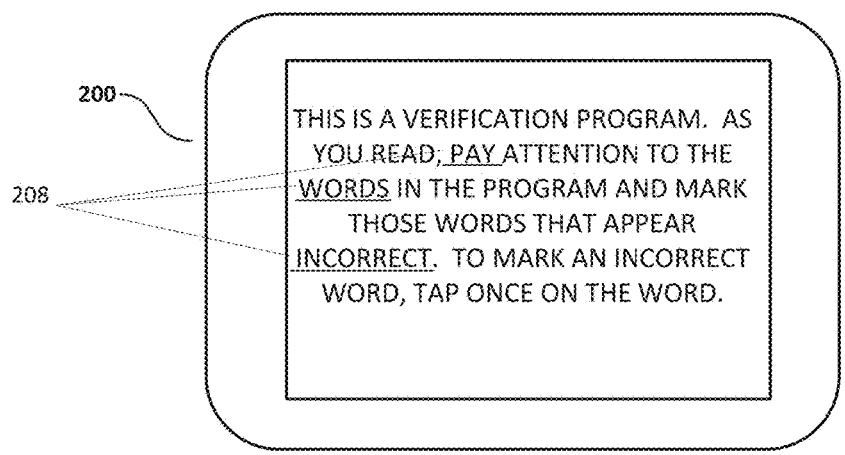
FIG. 2C illustrates how optical character recognition results are displayed to the user for their verification.

Step 116 may involve displaying modified OCR results, which contain for the error location the most probable OCR variant, which is different than the initial OCR variant for the error location. Other than making such correction for the error location, the modified OCR results may be identical to the initial OCR results. The user may move the camera, which is zoomed in and/or brought closer to the hard copy of the document, from one error location to another. The method may involve highlighting a correction for the error location in the displayed modified OCR results. A highlighting color or method of highlighting for the correction may differ from a color or method, which may be used for highlighting an error location identified by the user. For example, FIG. 2C shows highlighted corrections by underlining 208 (words "PAY", "WORDS" and "INCORRECT"), which correspond to error locations 202 in FIG. 2A. The method may also involve producing a signal, such as a sound or a color change, when the displayed OCR results are modified, i.e. when the computer system finds and displays an alternative/different OCR variant for an error location.

In step 118, the computer system may receive an additional feedback from the user regarding an error in the modified OCR results. In certain case, an error in the modified OCR results may be an error in a new location, which was not previously identified by the user as an error location. Yet in some case, an error in the modified OCR results may be an error in the previously identified error location. This scenario corresponds to the situation when the user is not satisfied with the correction for the error location displayed in the modified search results. As in step 104, the user provides his/her feedback by identifying a location of an error in the modified OCR results.

If the user does provide an additional feedback an error (by identifying the location of the error) in the modified OCR results, then the method may return to step 106 for obtaining one or more additional images in order to find an alternative/different OCR variant for the identified error location.

The user may provide a feedback regarding errors in the displayed OCR results by identifying their locations at any moment when the disclosed method is performed.

If after a certain, pre-determined time from displaying the modified OCR results, the computer system does not receive an additional feedback from the user, the computer system may assume that there are no more errors, i.e. that the displayed modified OCR results may be considered to be verified OCR results (step 120).

Verification of optical character recognition results may also be applied to patterned documents, such as the ones disclosed in U.S. patent application Ser. No. 15/195,603. A patterned document has at least one static element and at least one information field. Verification of optical character recognition results of a patterned document may involve obtaining one or more images of the document. The image(s) may be received by a processing device of a computer system, which may perform optical character recognition of the image(s) to produce optical character recognition results of the image(s). The optical character recognition results may be matched with a template of the patterned document. As the result of such matching, portion(s) of the optical character recognition results, which correspond to static element(s) of the patterned document may be sorted out, while portion(s) of the optical character recognition results, which correspond to information field(s) of the patterned documents, may be kept for further processing. Thus, when processing multiple, i.e. more than one, images of the patterned document, multiple OCR character sequences may be produced for each information field of the patterned document. Using a median string, a best (most probable) OCR character sequence may be obtained for each information field from corresponding multiple OCR character sequences. The best OCR character sequence for a particular information field may be then displayed to a user of the computer system. For a patterned document with multiple information fields, best OCR character sequences for information fields of the document may be, for example, displayed to the user as a list. The user may provide his feedback to the computer system if he/she sees that a best OCR character sequence for a particular information field of the patterned document contains an error, i.e. when the best OCR character sequence differs from a corresponding character sequence in the original patterned document. For example, the user may provide such feedback by touching or tapping the displayed best OCR character sequence for a particular information field on a touch screen display of the computer system. After the computer system receives the feedback from the user regarding an error in the displayed best OCR sequence, it may display to the user another OCR character sequence from the multiple OCR character sequences for the information field. The other OCR character sequence may be, for example, the second best (the second most probable) OCR character sequence from the multiple OCR character sequences for the information field. The user may provide his/her feedback multiple times. When the system does not receive a feedback from the user after a certain amount of time, the system may assume that the displayed OCR sequence for a particular information field does not have an error. Thus, the system will assume that the displayed OCR sequence is a verified OCR character sequence for the information field. The system may then send the verified OCR character sequence to a database. In certain embodiments, the computer system may display a best OCR character sequence for each of multiple, i.e. more than one, information fields, for example, as a list. The user then may identify among displayed OCR character sequences one or more character sequences, which contain an error. For each information field, for which the user identifies a corresponding best OCR character sequence as containing an error, the computer system may display a corresponding second best OCR character sequence.

The computer system may be, for example, a computer system, which is illustrated in FIG. 3. The computer system may be a device capable of executing a set of instructions (sequential or otherwise) that specify operations to be performed by that computer system. For example, a personal computer (PC), a tablet PC, a set-top box (STB), a Personal Digital Assistant (PDA), or a cellular telephone.

FIG. 3 depicts a component diagram of an example computer system 300 within which a set of instructions, for causing the computer system to perform any one or more of the methods discussed herein, may be executed. The computer system 300 may be connected to other computer system in a LAN, an intranet, an extranet, or the Internet. The computer system 300 may operate in the capacity of a server or a client computer system in client-server network environment, or as a peer computer system in a peer-to-peer (or distributed) network environment. The computer system 300 may be a provided by a personal computer (PC), a tablet PC, a set-top box (STB), a Personal Digital Assistant (PDA), a cellular telephone, or any computer system capable of executing a set of instructions (sequential or otherwise) that specify operations to be performed by that computer system. Further, while only a single computer system is illustrated, the term "computer system" shall also be taken to include any collection of computer systems that individually or jointly execute a set (or multiple sets) of instructions to perform any one or more of the methodologies discussed herein.

Exemplary computer system 300 includes processor 302, main memory 304 (e.g., read-only memory (ROM) or dynamic random access memory (DRAM)), and data storage device 318, which communicate with each other via bus 330.

Processor 302 may be represented by one or more general-purpose processing devices such as a microprocessor, central processing unit, or the like. More particularly, processor 302 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. Processor 302 may also be one or more special-purpose processing devices such as an application specific integrated circuit (ASIC), a field programmable gate array (FPGA), a digital signal processor (DSP), network processor, or the like. Processor 302 is configured to execute instructions 326 for performing the operations and functions of the method of FIG. 1.

Computer system 300 may further include network interface device 322, video display unit 310, a character input device 312 (e.g., a keyboard), and touch screen input device 314. Data storage device 318 may include a computer-readable storage medium 324 on which is stored one or more sets of instructions 326 embodying any one or more of the methods or functions described herein. Instructions 326 may also reside, completely or at least partially, within main memory 304 and/or within processor 302 during execution thereof by computer system 300, main memory 304 and processor 302 also constituting computer-readable storage media. Instructions 326 may further be transmitted or received over network 316 via network interface device 322.

In certain implementations, instructions 326 may include instructions for performing one or more functions of method of FIG. 1. While computer-readable storage medium 324 is shown in the example of FIG. 3 to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

An exemplary computer system may include a processor, a main memory (e.g., read-only The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and software components, or only in software.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "determining", "computing", "calculating", "obtaining", "identifying," "modifying" or the like, refer to the actions and processes of a computer system, or similar electronic computer system, that manipulates and transforms data represented as physical (e.g., electronic) quantities within the computer system's registers and memories into other data similarly represented as physical quantities within the computer system memories or registers or other such information storage, transmission or display devices.

The present disclosure also relates to an apparatus for performing the operations herein. This is apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions. It is to be understood that the above description is intended to be illustrative, and not restrictive.

Various other implementations will be apparent to those of skill in the art upon reading and understanding the above description. The scope of the disclosure should, therefore, be determined with reference to the appended claims, along with the full scope of equivalents to which such claims are entitled.

What is claimed is:

1. A method comprising:
performing optical character recognition on one or more initial images of a document to produce initial optical character recognition results and displaying the initial optical character recognition results of the document to a user;
receiving a feedback from the user regarding an error location in the initial optical character recognition results, wherein the error location is a location of a misspelled character sequence in the initial optical character recognition results;
receiving an additional image of the document, wherein the additional image contains a portion of the document, which corresponds to the error location;
performing optical character recognition of the additional image to produce additional optical character recognition results;
identifying a cluster of character sequences corresponding to the error location by matching the initial optical character recognition results and the additional optical character recognition results;
performing, for each of the cluster of characters, a probability evaluation to determine a plurality of probability values for the cluster of characters;
identifying, based on the probability values, a character sequence of the cluster of character sequences as a corrected character sequence; and
displaying to the user modified optical character recognition results, which contain in the error location the corrected character sequence, wherein the corrected character sequence is different from the misspelled character sequence.

2. The method of claim 1, wherein the additional image differs from the one or more initial images in at least one of: an image noise, an image scale, a shooting angle and an image brightness.

3. The method of claim 1, wherein said identifying the cluster of character sequences, which correspond to the error location, comprises: identifying in the initial optical character recognition results and the additional optical character recognition results a plurality of common features to identify reference points.

4. The method of claim 3, further comprising identifying using coordinates of the reference points parameters of a coordinate transformation converting coordinates of the additional optical character recognition results into coordinates of the initial optical character recognition results.

5. The method of claim 1, wherein said identifying, based on the probability values, the character sequence of the cluster of character sequences as the corrected character sequence comprises determining a pre-determined metric for each character sequence of the cluster and resorting the character sequences of the cluster according to the probability values.

6. The method of claim 5, wherein the pre-determined metric is a sum of edit distances between a character sequence of the cluster and each of the other character sequences of the cluster and wherein the character sequences are resorted so that a character sequence with a lowest value of the metric goes is the top of the cluster, while a character sequence with a highest value of the metric is on the bottom of the cluster.

7. The method of claim 1, wherein the one or more initial images and the additional image are obtained in a continuous sequence of images.

8. The method of claim 1, wherein displaying to user the modified optical character recognition results comprises highlighting in the displayed modified optical character recognition results the corrected character sequence.

9. The method of claim 1, further comprising, after said receiving the feedback from the user, highlighting the error location in the displayed initial optical character recognition results.

10. The method of claim 1, which performed by a mobile device.

11. The method of claim 10, wherein the mobile device is one of a mobile phone, a tablet, a laptop, a smartphone or a PDA.

12. The method of claim 10, wherein said receiving the feedback from the user comprises receiving a feedback from a location of a touch screen display of the mobile device, which corresponds to the error location.

13. The method of claim 10, wherein the mobile device comprises a camera and the one or more initial images and the additional image are acquired by said camera.

14. A system comprising:
a memory;
a display; and
a processing device, which is coupled to the memory and the display, the processing device is configured to:
perform optical character recognition on one or more initial images of a document to produce initial optical character recognition results and display the initial optical character recognition results to a user;
receive a feedback from the user regarding an error location in the initial optical character recognition results, wherein the error location is a location of a misspelled character sequence in the initial optical character recognition results;
receive an additional image of the document, wherein the additional image contains a portion of the document, which corresponds the error location;
perform optical character recognition on the additional image to produce additional optical character recognition results;
identify a cluster of character sequences corresponding to the error location by matching the initial optical character recognition results and the additional optical character recognition results;
perform, for each of the cluster of characters, a probability evaluation to determine a plurality of probability values for the cluster of characters;
identify, based on the probability values, a character sequence of the cluster of character sequences as a corrected character sequence; and
display to the user modified optical character recognition results, which contain in the error location the corrected character sequence, wherein the corrected character sequence is different from the misspelled character sequence.

15. The system of claim 14, which is a mobile device.

16. The system of claim 15, wherein the mobile device is a one of a mobile phone, a tablet, a laptop, a smartphone or a PDA.

17. The system of claim 14, wherein the display is a touch-screen display and wherein the processing device receives the feedback from the user regarding the error location by receiving a feedback from a location of the touch-screen display touched by the user.

18. The system of claim 14, further comprising a camera configured to acquire the one or more images and the next image and to transfer each of the one or more images and the next image to the processing device.

19. A computer-readable non-transitory storage medium comprising executable instructions that, when executed by a processing device, cause the processing device to:

perform optical character recognition on one or more initial images of a document to produce initial optical character recognition results and display the initial optical character recognition results of the document to a user;

receive a feedback from the user regarding an error location in the initial optical character recognition results, wherein the error location is a location of a misspelled character sequence in the initial optical character recognition results;

receive an additional image of the document, wherein the additional image contains a portion of the document, which corresponds to the error location;

perform optical character recognition on the additional image to produce additional optical character recognition results;

identify a cluster of character sequences corresponding to the error location by matching the initial optical character recognition results and the additional optical character recognition results;

perform, for each of the cluster of characters, a probability evaluation to determine a plurality of probability values for the cluster of characters;

identify, based on the probability values, a character sequence of the cluster of character sequences as a corrected character sequence; and display to the user modified optical character recognition results, which contain in the error location the corrected character sequence, wherein the corrected character sequence is different from the misspelled character sequence.

* * * * *